United States Patent [19]

Dreier

[11] Patent Number: 5,537,287
[45] Date of Patent: Jul. 16, 1996

[54] PROTECTIVE CIRCUIT FOR A SUBSCRIBER LINE CIRCUIT AND A SUBSCRIBER LINE CIRCUIT HAVING SUCH A PROTECTIVE CIRCUIT

[75] Inventor: Benno Dreier, Korntal-Münch, Germany

[73] Assignee: Alcatel N. V., Rijswijk, Netherlands

[21] Appl. No.: 371,105

[22] Filed: Jan. 11, 1995

[30] Foreign Application Priority Data

Jan. 28, 1994 [DE] Germany .................. 44 02 461.4

[51] Int. Cl.$^6$ .................................................. H02H 3/22
[52] U.S. Cl. ................ 361/119; 361/127; 361/56
[58] Field of Search ......................... 361/119, 127, 361/58, 106, 56

[56] References Cited

U.S. PATENT DOCUMENTS

| | | | |
|---|---|---|---|
| 4,720,845 | 1/1988 | Lechner et al. | 379/27 |
| 5,388,021 | 2/1995 | Stahl | 361/56 |

FOREIGN PATENT DOCUMENTS

| | | |
|---|---|---|
| 0242562 | 10/1987 | European Pat. Off. . |
| 0372673 | 6/1990 | European Pat. Off. . |
| 0393333 | 10/1990 | European Pat. Off. . |
| 3200828 | 8/1982 | Germany . |
| 3340927 | 5/1985 | Germany . |
| 838880 | 6/1981 | U.S.S.R. . |
| 2224402 | 5/1990 | United Kingdom . |

OTHER PUBLICATIONS

"Protection of Subscriber Line Interface Circuits", T. Kobayashi et al, NEC Research & Development (1987) Jul., No. 86, Tokyo, Japan, pp. 81–90.

*Primary Examiner*—Todd Deboer
*Attorney, Agent, or Firm*—Ware, Fressola, Van Der Sluys & Adolphson

[57] ABSTRACT

Protective circuit with a threshold circuit for discharging overvoltage surges to ground and with a low-value resistor positioned in a line wire at the subscriber's end meets a higher level of lightning protection by connecting a voltage-limiting component (V1, V2) in parallel with the low-value resistor (R1, R2). Such may a varistor connected in parallel with each of the series low-value feed or sensing resistors. The invention meets symmetry requirements, places low voltage requirements on low-value resistors and preceding parallel components, makes use of inexpensive voltage-limiting components and thereby results in cost saving.

3 Claims, 1 Drawing Sheet

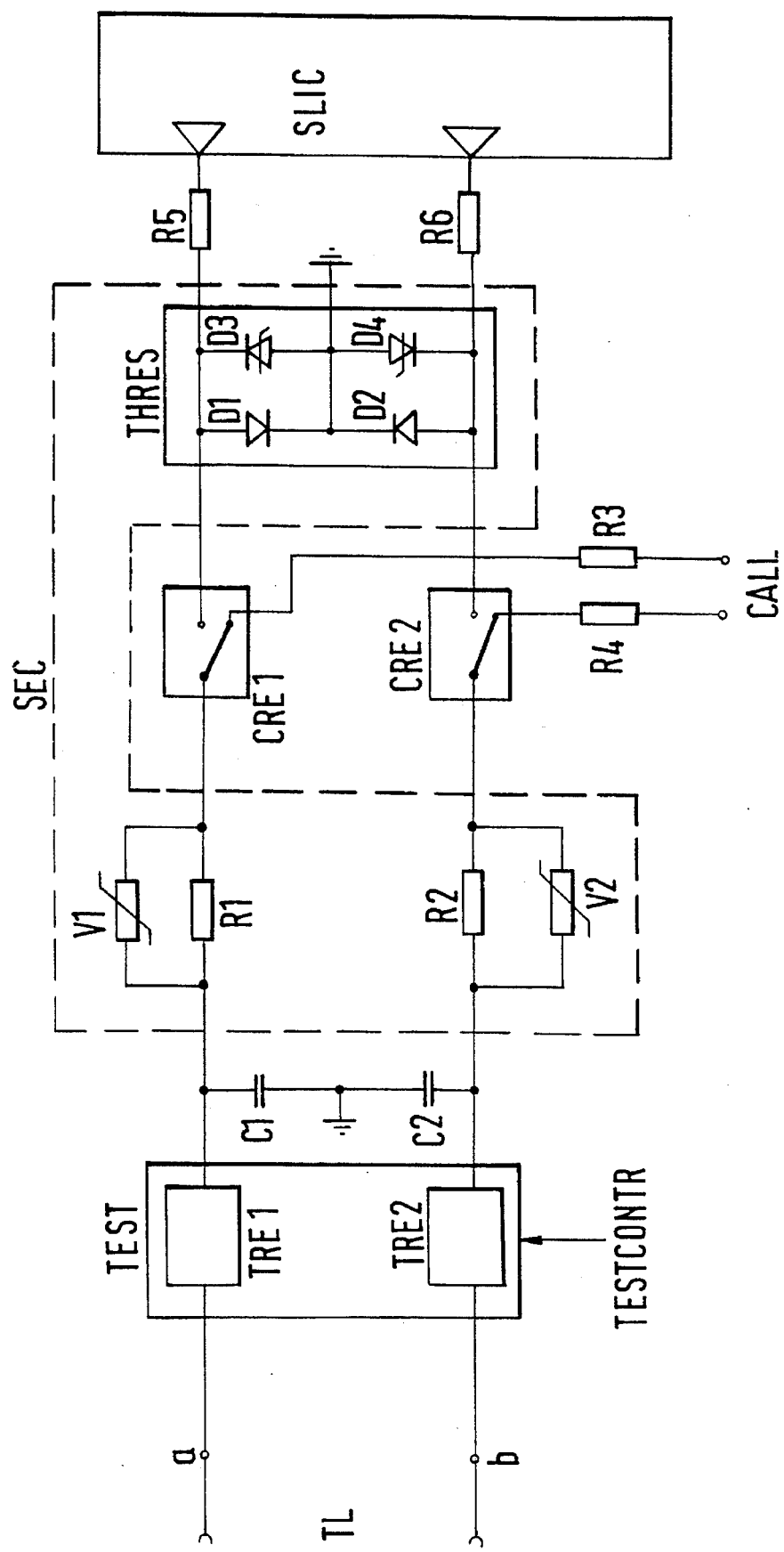

5,537,287

PROTECTIVE CIRCUIT FOR A SUBSCRIBER LINE CIRCUIT AND A SUBSCRIBER LINE CIRCUIT HAVING SUCH A PROTECTIVE CIRCUIT

TECHNICAL FIELD

The invention concerns a protective circuit for a subscriber line circuit and a subscriber line circuit connected to a protective circuit.

BACKGROUND OF THE INVENTION

The invention starts with a protective circuit for the protection of a subscriber line circuit against overvoltage, as described in the European patent application EP 0242562 B1.

Subscriber line circuits generally need protective circuits to protect components or modules that are sensitive to overvoltage against excess voltage. Such overvoltage is often caused by atmospheric discharges or by the magnetic coupling of power lines, and is pulse-shaped or sinusoidally-shaped in nature.

The European patent application EP 0242562 B1 contains a protective circuit in the subscriber line before the part of the subscriber line circuit to be protected, which comprises a 50 Ω resistor and a thyristor diode as the threshold value circuit element for each line conductor. The protective circuit is constructed symmetrically for both line conductors. The thyristor diode dissipates excess voltage to ground. On the subscriber line side the resistor is inserted into the line conductor before the thyristor diode, and serves to limit the current in the event of an excess voltage.

Such a protective circuit must offer a certain protection against lightning, which is simulated as follows: an overvoltage source with a certain internal resistance and a certain impressed pulse- or sinusoidally-shaped overvoltage is applied to the subscriber line circuit for a certain period of time. This must not damage the subscriber line circuit.

Problems occur with the above protective circuit if the lightning protection requirement is increased, particularly with respect to the magnitude of the overvoltage. Because of the high requirements of resistance symmetry in subscriber line circuits, the two resistors are often realized in a thick-film hybrid technique and are balanced with a laser. This very much limits the voltage strength of these resistors which can only be increased by means of expensive technology.

The solution of this problem, as discussed in professional circles, is to insert a PTC in series with the resistor in each conductor line. However, such PTCs are relatively expensive and result in problems with the resistance symmetry.

DISCLOSURE OF INVENTION

It is an object of the invention to present a protective circuit and a subscriber line circuit that can fulfill the conditions of increased lightning protection.

According to the invention, a protective circuit for a subscriber line circuit, which is connected to a subscriber line, with a low-value resistor and a threshold circuit for dissipating overvoltage to a line point with a ground potential, wherein the low-value resistor is serially positioned in a line branch which connects one conductor of the subscriber line to a part of the subscriber line circuit to be protected, and the threshold circuit is connected to a connection point on this branch line between the low-value resistor and the part of the subscriber line circuit to be protected, is characterized in that a voltage limiting component is connected in parallel with the low-value resistor.

In further accord with the invention, the voltage limiting component is a varistor.

In still further accord with the present invention, a subscriber line circuit with a connection to a subscriber line and with a protective circuit, which is equipped with a low-value resistor and a threshold circuit for dissipating overvoltage to a line point with a ground potential, wherein the low-value resistor is serially positioned in a line branch connecting a conductor of the subscriber line with a part of the subscriber line circuit to be protected, and the threshold circuit is connected to a connection point on this branch line between the low-value resistor and the part of the subscriber line circuit to be protected, is characterized in that a voltage limiting component is connected in parallel with the low-value resistor.

The basic idea of the invention is to connect a voltage-limiting component in parallel with the protective circuit's resistor. Such a component has high resistance under normal conditions and low impedance in the case of excess voltage. This lowers the total resistance of the resistor and the voltage-limiting component in the case of overvoltage. A greater portion of the overvoltage decreases in the line resistor of the subscriber line, thus reducing the voltage requirements of the resistor. Although the current requirements increase for the threshold circuit, e.g. for the thyristor diode, they are mostly in the allowable range or can be fulfilled at low cost, because of the type of components being used.

The invention has an advantage in that no high requirements are made on the symmetry of the voltage-limiting components, since these have high resistance under normal conditions and do not present any concerns. In addition varistors, which can be used as voltage-limiting components for example, are low priced standard components. Another advantage is that the voltage strength of series-connected components, e.g. capacitors for filtering out high-frequency interference, does not need to be increased, but can rather be decreased. The same applies to the resistance. This also produces cost savings.

These and other objects, features and advantages of the present invention will become more apparent in light of the following detailed description of a best mode embodiment thereof, as illustrated in the accompanying drawing.

BRIEF DESCRIPTION OF THE DRAWING

The sole figure illustrates a section of the block circuit diagram of a subscriber line circuit according to the invention with a protective circuit according to the invention.

BEST MODE FOR CARRYING OUT THE INVENTION

The figure depicts two connection points a and b, a subscriber line TL, a testing installation TEST, two capacitors C1 and C2, a plurality of resistors R1 to R6, two varistors V1 and V2, two ringing relays CRE1 and CRE2, one threshold circuit THRES and one integrated switching circuit SLIC.

The two connection points a and b are connected to the subscriber line TL on the subscriber side. On the exchange side, connection point a is connected to the integrated switching circuit SLIC via the testing installation TEST, the resistor R1, the ringing relay CRE1, the threshold circuit THRES and resistor R5, and connection point b is connected via the testing installation TEST, the resistor R2, the ringing relay CRE2, the threshold circuit THRES and resistor R6. A branch line between the testing installation TEST and the resistor R1 is connected to ground through capacitor C1, and a branch line between the testing installation TEST and the resistor R2 through capacitor C2. Varistors V1 and V2 are connected in parallel with resistors R1 and R2, respectively. Thus, the two branch lines between connection point a and the integrated switching circuit SLIC, and between connection point b and the integrated switching circuit SLIC, have symmetrical circuits.

The testing installation TEST comprises two test relays TRE1 and TRE2, which are respectively inserted into a branch line between connection point a and resistor R1, or between connection point b and resistor R2. The two test relays TRE1 and TRE2 allow a galvanic connection to two test buses, through which a maintenance arrangement can directly access the subscriber line TL to perform the different maintenance functions. The position of the test relays TRE1 and TRE2 is controlled by the test-control signal TEST-CONTR.

The two capacitors C1 and C2 serve to intercept high-frequency interference.

The resistors R1 and R2 are also called feeder or sensor resistors and serve to limit the current. However, it is also possible to tap into the decreasing voltage therein and use it as information for other control and adjustment tasks not described here.

Subscriber line circuits make high demands on the resistance symmetry of the two line conductors. For that reason it is necessary for the two resistors R1 and R2 to have the same value with a high degree of accuracy. Without limiting the generality, in this instance the two resistors R1 and R2 have a value of 50 Ω and are realized in a thick-film hybrid technique. They were balanced to the same value with a high degree of accuracy by a laser.

The two varistors V1 and V2 have the characteristic of very high resistance at low voltage, and very quickly exhibit low resistance impedance when a certain threshold voltage is exceeded. In this instance, other voltage-limiting components can be used instead of varistors. Such components are e.g. a diac (diode alternating-current switch), a zener diode or a thyristor diode.

The two ringing relays CRE1 and CRE2 provide the line entry of a call CALL. The call CALL is thereby coupled into the subscriber line TL through resistors R3 and R4, whose respective value is 300 Ω.

It is also possible for the call coupling or the testing installation TEST to be constructed in a different way. In particular, MOSFET switches can be used instead of relays.

The threshold circuit THRES contains two diodes D1 and D2 and two thyristor diodes D3 and D4. The anodes of both diodes D1 and D2 and the cathodes of both thyristor diodes D3 and D4 are respectively connected to ground. The cathode of diode D1 and the anode of thyristor diode D3 are connected to the branch line between the ringing relay CRE1 and the resistor R5. The cathode of diode D2 and the anode of thyristor diode D4 are connected to the branch line between the ringing relay CRE2 and the resistor R6. The result is a threshold circuit with bidirectional properties. The two diodes D1 and D2 conduct positive voltages to ground. This is necessary since the potential in the conductors of a subscriber line is normally negative, and a positive potential must be attributed to overvoltage. If a certain negative threshold voltage is exceeded, the two thyristor diodes very quickly change from a high-resistance condition to a low-resistance condition and thereby conduct overvoltage to ground. The threshold circuit is selected so that the downstream integrated switching circuit SLIC is not destroyed.

It is also possible to construct the threshold circuit THRES differently from the illustration in the figure. The threshold circuit THRES could e.g. include two zener diodes. The level of protection could also be adaptively altered. For instance, thyristors could be used.

Each of the resistors R5 and R6 may have, e.g., a value of 10 Ω.

It is also possible to omit the resistors R5 and R6 or the capacitors C1 and C2, or to replace their function with other components or circuit arrangements.

An integrated switching circuit SLIC is a highly integrated customer circuit, which performs other functions of a subscriber line circuit. The integrated switching circuit SLIC is easily destroyed by overvoltage and in this instance represents the part of the subscriber line circuit to be protected.

The two resistors R1 and R2, the two varistors V1 and V2 and the threshold circuit THRES form a protective circuit SEC.

The following function of the protective circuit SEC takes place under normal operating conditions. The varistors V1 and V2 are in the high-resistance condition and the test relays TRE1 and TRE2 and the ringing relays CRE1 and CRE2 are switched through. The threshold circuit THRES is also in the high-resistance condition. This determines the current paths from connection points a and b to the integrated switching circuit SLIC through resistors R1 and R5 or through resistors R2 and R6.

If the call CALL is connected, the current path is determined by resistors R1 and R3 or by R2 and R4. In that case it is necessary to select the threshold voltage of varistors V1 and V2 in such a way, that varistors V1 and V2 are still in the high-resistance condition at maximum ringing voltage.

If e.g. a high overvoltage now reaches connection point a threshold circuit THRES switches on and conducts the overvoltage pulse to ground. This prevents the overvoltage pulse from reaching the integrated switching circuit SLIC and destroying it. In addition to threshold circuit THRES, the varistor V1 also changes into the low-resistance condition. This reduces the total resistance of the two components connected in parallel, namely resistor R1 and varistor V1. However, the line resistance in the conductor of subscriber line TL, which is connected to connection point a and can be perceived as the internal resistance of the overvoltage source, remains the same. This reduces the portion of the overvoltage which decreases in resistor R1 and thereby also in capacitor C1. Consequently, the parallel-connected varistor V1 reduces the voltage requirements of resistor R1 and capacitor C1. However, the reduction of the total resistance of the two components, resistor R1 and varistor V1, in the instance of overvoltage, causes the current load on threshold circuit THRES to increase. But it remains in the area that is permissible for the components used therein.

Because of the symmetry, a corresponding condition occurs with an overvoltage pulse at connection point b.

It is also possible for the protective circuit SEC to be inserted at a different place in the subscriber line circuit. For example, the threshold circuit THRES can be inserted on the subscriber side of the ringing coupler (ringing relays CRE1 and CRE2), or on the subscriber side of the testing installation TEST, between the branch lines that connect connection points a or b with the integrated switching circuit SLIC. But care must be taken that resistors R1 and R2, and the varistors V1 and V2 connected in parallel, are inserted into the respective branch lines on the subscriber side of threshold circuit THRES.

It is also possible to realize the testing or ringing coupling functions by other means than with the testing installation TEST or the ringing relays CRE1 and CRE2.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. Protective circuit (SEC) for a subscriber line circuit, which is connected to a subscriber line (TL), with a low-value resistor (R1, R2) and a threshold circuit (THRES) for dissipating overvoltage to a line point with a ground potential, wherein the low-value resistor (R1, R2) is serially positioned in a line branch which connects one conductor of the subscriber line (TL) to a part (SLIC) of the subscriber line circuit to be protected, and the threshold circuit (THRES) is connected to a connection point on this line branch between the low-value resistor (R1, R2) and the part (SLIC) of the subscriber line circuit to be protected, wherein (a voltage limiting component) (V1, V2) is connected in parallel with the low-value resistor (R1, R2).

2. Protective circuit as claimed in claim 1, wherein the voltage limiting component (V1, V2) is a varistor.

3. Subscriber line circuit with a connection (a, b) to a subscriber line (TL) and with a protective circuit (SEC), which is equipped with a low-value resistor (R1, R2) and a threshold circuit (THRES) for discharging overvoltage to a line point with a ground potential, wherein the low-value resistor (R1, R2) is serially positioned in a line branch connecting a conductor of the subscriber line (TL) with a part (SLIC) of the subscriber line circuit to be protected, and the threshold circuit (THRES) is connected to a connection point on this line branch between the low-value resistor (R1, R2) and the part (SLIC) of the subscriber line circuit to be protected, wherein a voltage limiting component (V1, V2) is connected in parallel with the low-value resistor (R1, R2).

* * * * *

UNITED STATES PATENT AND TRADEMARK OFFICE
CERTIFICATE OF CORRECTION

PATENT NO. : 5,537,287
DATED : July 16, 1996
INVENTOR(S) : Dreier

It is certified that error appears in the above-indentified patent and that said Letters Patent is hereby corrected as shown below:

```
At column 6, line 5, please change "(a voltage
limiting component)" to --a voltage limiting component--.
```

Signed and Sealed this

First Day of October, 1996

Attest:

BRUCE LEHMAN

*Attesting Officer*    *Commissioner of Patents and Trademarks*